Oct. 27, 1959 K. H. MILLER 2,909,923
METHOD OF IDENTIFYING FLUIDS AND THEIR
POINTS OF INFLUX IN A WELL
Filed Aug. 26, 1957
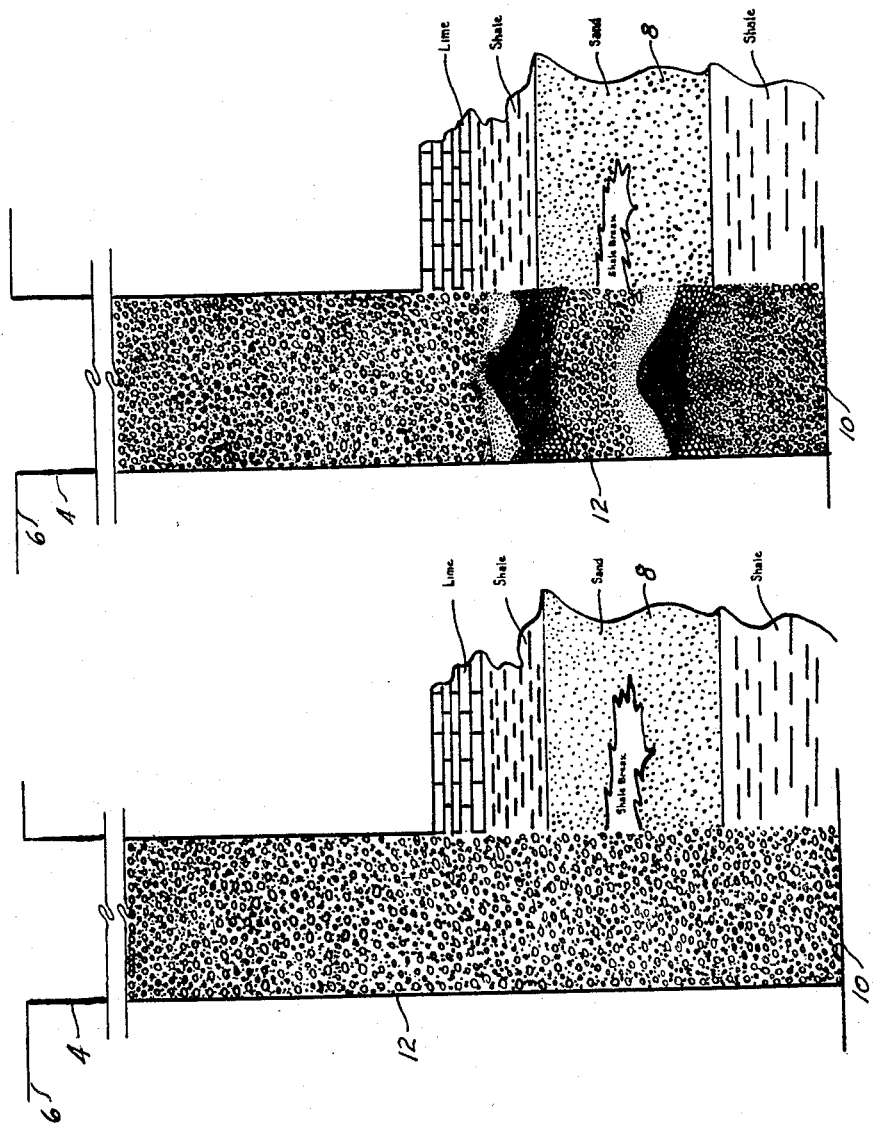
INVENTOR.
Kaiser H. Miller
BY
ATTORNEY

United States Patent Office 2,909,923
Patented Oct. 27, 1959

2,909,923

METHOD OF IDENTIFYING FLUIDS AND THEIR POINTS OF INFLUX IN A WELL

Kaiser H. Miller, Oklahoma City, Okla.

Application August 26, 1957, Serial No. 680,133

9 Claims. (Cl. 73—155)

This invention relates generally to improvements in the art of producing oil wells, and more particularly, but not by way of limitation, to an improved method for locating the points of influx of formation fluids into a well bore and identifying the fluids produced at the various points.

As it is well known in the producing division of the oil industry, oil well owners and producers seldom, if ever, know the precise portions of the well bore through which oil is being produced. The formations from which the oil is being produced are ordinarily known, and so long as the well is producing a high oil-water ratio, the precise depth at which the oil is being produced is merely academic. However, oil wells frequently produce a substantial proportion of water, with the proportion of water usually increasing during the life of the well. It then becomes important to locate the points where the water is entering the well bore in order that these portions of the well bore may be suitably plugged or sealed off, and the oil-water ratio of the well increased. It has been found that water frequently enters the well bore through a portion of the formation from which only oil was originally produced, i.e., the ordinary producing zone of the well. It is also well known that the producing zones or formations may vary in depth or thickness from several inches to several hundred feet.

Many methods and instruments have been devised in an attempt to locate the points of fluid influx into a well bore and to identify the fluids entering the well bore at the various points. For example, it is known to lower a volume indicating instrument (commonly known as a spinner surveying instrument) into the well bore. As such an instrument approaches a point where fluid is entering the well bore, the instrument indicates an increase volume of fluid flow. And, as the instrument passes a point of fluid influx, the instrument indicates a decrease of fluid flow. Therefore, at least the major points of fluid influx may be located. However, the instrument is incapable of identifying the fluid being produced at the particular points. Therefore, an assumption must be made as to the points where water is entering the well bore, with frequent errors resulting in sealing off the wrong portions of a well bore and actually decreasing the oil productivity of the well.

Another well known method of determining fluid influx in a well is by use of a "drill stem test." In this test, a straddle type packing device is lowered into the well bore on the lower end of a string of drill pipe and the packers are set to isolate a portion of the well bore. The fluids entering the well bore between packers is then diverted into the drill stem, whereby the identity of these fluids may be determined. However, the drill stem test may be used, as a practical matter, only immediately following a drilling operation by a rotary drilling unit. Furthermore, the method is expensive to perform and is extremely time consuming for the drilling unit and the personnel operating the drilling unit. In addition, the method does not lend itself to a precise location of the points of oil and water entry.

The present invention contemplates a novel method of determining the points of oil, water and gas entry in a well bore, which method may be performed immediately after drilling the well, or after the well has been on production for any length of time. I contemplate positioning a granulated material in the producing zone of the well in such a manner that the granulated material will be subjected to the washing action of the fluid produced in the zone. The granulated material is comprised of particles varying in size, whereby the washing action of fluid entering the producing zone will tend to stratify the various sizes of particles, with the larger particles being at the lower end of a section where fluid is entering the well bore. By correlating the stratification of the material with the depth of the producing zone, the precise points of fluid influx may be determined. I further contemplate the analysis of such material after its removal from a well, whereby the identity of the fluid entering the well bore at the various points may be determined.

An important object of this invention is to precisely determine the points of fluid influx in a well.

Another object of this invention is to identify the fluids entering a well, along with the precise points at which the different fluids enter the well.

A further object of this invention is to provide a method of identifying the fluids and their points of influx in a well, which method may be performed by the use of apparatus and materials normally available at or near the well location.

A still further object of this invention is to provide a method of identifying the fluids and their points of influx into a well, which method is economical to perform and may be performed without the use of specialized technicians.

Another, and general, object of this invention is to provide means and information for increasing the oil-water ratio of a producing oil well.

Other objects and advantages of the invention will be evident from the following detailed description, when read in conjunction with the accompanying drawings which illustrate my invention.

In the drawings:

Figure 1 is a schematic sectional view through a well bore illustrating the deposit of granular material in the well bore opposite the producing zone.

Figure 2 is another schematic sectional view of a well bore illustrating the stratification of the granular material after the material has been subjected to the washing action of fluids entering the well bore from various points in the producing zone.

Referring to the drawings in detail, and particularly Fig. 1, reference character 4 designates a well bore extending from the surface 6 downwardly through a normally productive formation 8. The formation 8 may be any type of normally oil-containing material, such as sand, which is illustrated as being covered and deposited on layers of shale, with a lime formation above the upper shale. I have shown the bottom 10 of the well bore 4 as being only slightly below the producing formation 8, as will ordinarily be the case when a single formation is being produced. However, it is to be understood that the present invention is useful in wells wherein the producing formation is a substantial distance above the bottom of the well, as when the well is producing from two or more formations. If the bottom 10 of the bore 4 is a substantial distance below the producing formation being tested, the well bore 4 is preferably plugged off slightly below the particular producing formation.

In practicing the present invention with low pressure wells (that is, wells wherein the fluid entering the well bore must be removed by an artificial lifting means), the well is allowed to come to a static condition, then the fluids in the well bore 4 directly opposite the formation 8 are displaced by a liquid other than oil. The displacing liquid may be easily injected into the well bore 4 at a level below the formation 8, whereby the injected liquid displaces formation fluids standing in the well bore upwardly beyond the top of the producing formation. I have found that water may be effectively used for this purpose. The water is injected until it completely fills the well bore 4 throughout the height of the formation 8. The depth of the liquid in the well bore 4 is then adjusted such that the hydrostatic pressure of the water adjacent the formation 8 will be substantially equal to the normal formation pressure. This depth may be obtained by either injecting oil or water into the top of the well bore 4, or by removing liquid from the well bore, depending upon the depth of the liquid following injection of sufficient water to cover the face of the formation 8. When this condition is reached, formation fluids will not be entering the well bore 4 from the formation 8.

Following injection of the water into the zone of the well bore opposite the formation 8, a granular material of variable particle size is then deposited in this zone. The granular material may be of any desired kind, such as sand, cement, or small pieces of plastic, so long as the material has a substantial particle size range. Also, the granular material should be deposited in the zone of the well bore opposite the formation 8 in such a manner that the various sizes of particles will be thoroughly mixed to provide a variety of particle sizes at each increment of depth of the solid material. I have found that ordinary builder's sand is very useful in low pressure wells.

Any desired apparatus may be used for depositing the granular material 12 in the well bore. When tubing or pipe and suitable pumps are available, the material 12 may be pumped through a tubing to a point adjacent the bottom 10 of the bore 4, and then the tubing raised during the pumping operation as the material 12 fills the well bore 4 to a point substantially above the formation 8. It may be noted here that if the formation 8 is a substantial distance above the bottom 10, a suitable packer or bridge (not shown) may be set in the well bore 4 a short distance below the formation 8 to support the material 12. This would minimize the amount of material 12 deposited in the well. Also, instead of a string of tubing or pipe, I may use a dump bailer to deposit the material 12 in the well bore 4. The bailer is run into the well as many times as necessary to dump material 12 onto the bottom 10, until the material 12 extends substantially above the formation 8.

After the material 12 has been deposited in a mixed condition, the liquid standing above the material 12 is then gradually removed to induce a flow of formation fluids from the formation 8 into the material 12 and up the well bore 4. Any suitable means may be used to remove the liquid from the well bore 4, such as bailers, pumps or swabs, as is well known in the art. It will be apparent that when the hydrostatic head of the liquid in the well bore 4 is reduced, fluid will tend to flow from the formation 8 into the well bore 4 and through the material 12. Liquid is removed from the well at a rate such that the formation fluids flowing through the material 12 will stratify the material, as described below.

Figure 2 indicates the effect the influx of formation fluid from the formation 8 will have on the material 12. At each section where a formation fluid enters the well bore 4, the material 12 will tend to be stratified, since the smaller particles will have the greater tendency to be washed upwardly in the well bore 4. The material 12 will usually be stratified with several different layers of larger particles, as illustrated in Fig. 2. In addition to stratifying the material 12, the material 12, and/or the pores between the particles, will become saturated with the various formation fluids, with the concentration of the particular fluid being greater at a level in the material 12 corresponding to the level of the entry of the particular fluid from the formation 8. This saturation characteristic is particularly marked when, as is the usual case, the water enters the well bore 4 below the oil and gas.

After the well 4 has been produced a sufficient length of time, usually about 24 hours, for the material 12 to become stratified and saturated, the material 12 is removed from the well in any suitable manner such that the relationship of the various sizes of particles will be retained.

A sand pump may be conveniently used to remove the material 12, particularly when the material has not become packed too solidly by the liquid standing in the well above the formation 8. When using a sand pump, the material 12 is removed in small increments of depth, such as 6 inches, in order that the relationship of the various sizes of particles will be retained when the material is completely removed from the well. I also contemplate the use of a core barrel, whereby the material 12 is removed by a coring operation similar to the original coring of a well as the well is being drilled. In this method, the precise particle relationship is retained upon removal of the cores from the well. Coring also facilitates the analysis of the material 12 for the fluid content and the identity of the various fluids in the various portions of the material 12. When using a coring technique, it is desirable to freeze the cores, in a manner well known in the art, whereby the fluid content of the cores will be the same when the cores are examined, as when the material 12 was in the well bore. It should also be noted that when using either a sand pump or core barrel, the diameter of the instrument should be substantially the same as the diameter of the well bore 4 to prevent caving in of the material 12 as it is being removed, whereby the down-the-hole stratification of the material will be retained.

When the material is removed from the well, the stratification of the material is correlated with the depth of the formation 8. The outer portion of each layer of the larger particles in the removed material indicates the bottom of a section at which a fluid was entering the well bore from the formation 8. The height of the area of fluid influx would extend from the larger particles upwardly to a point somewhere below the next upper level of larger particles. Then, by the usual core analysis techniques, the fluid content of the material 12 is correlated with the stratification of the material. Each portion of the material 12 opposite the point where a fluid entered the well bore will be predominantly saturated with the fluid entering the bore at the respective point. This is particularly true, as is noted above, when the oil and gas enters the well bore above the water, for then the initially water saturated material 12 in the lower portion of the formation 8 will never be contacted by the oil entering the well. In the event oil is entering the well bore from the lower portion of the formation, the lower portion of the material 12 will be predominantly saturated with oil. Although the material 12 above the points of oil influx would, in such a case, be at least partially saturated with oil, the knowledge of the lower points of substantially pure oil influx is extremely useful to the operator of the well. Furthermore, this information may be correlated with electric logs and spinner surveys of the well to more precisely define the points of water influx. The electric logs will indicate the zones where oil is likely to be entering the well bore, and when a point of oil entry is definitely established, the remainder of the electric log will be more easily interpreted. A spinner survey may be used in conjunction with the present method to indicate the points where the major portion of the fluid is entering the well from the formation 8, which, along with the oil-water ratio history of the well will give very useful information regarding the points of water influx.

In high pressure wells, it may be necessary to inject a heavy water base drilling mud into the well bore opposite the formation 8 in order to "kill" the well and stop the inflow of formation fluids into the well bore. In this event, the drilling mud will take the place of the water described above to displace the formation fluids from the face of the formation 8. The granular material may then be injected into the bottom 10 of the well by use of tubing and suitable pumps, as described above, to displace the drilling mud upwardly in the well bore. The remainder of the method will be carried out in the same manner as previously described.

After the material 12 has been removed from the well and the points of water, oil and gas entry determined, the desired remedial action may be taken to close off all or substantially all of the points of water influx by the use of squeeze cementing or liners, as is well known in the art. After this remedial action, the oil-water ratio of the well will be materially increased to increase the economy of operating the well. When the present method is used on newly drilled wells, the information obtained is very useful in the subsequent completion operations, such as fracturing, and setting casing.

It may also be noted that the present method may be used when the well is completed either open hole or by the use of perforated casings or liners.

From the foregoing it will be apparent that the present invention will identify both the points of fluid influx into a well bore and the identity of the fluid entering the well bore at the various points. The method may be performed by the use of apparatus and materials ordinarily available at or near the well location, and the method may be performed quickly and economically. It will also be apparent that the present invention provides a means for increasing the oil-water ratio of a producing well, and for generally increasing the economy of producing oil wells.

Changes may be made in the combination and arrangement of steps and materials heretofore set forth in the specification and shown in the drawings, it being understood that changes may be made in the precise embodiments disclosed without departing from the spirit and scope of the invention as defined in the following claims.

I claim:

1. In a method of locating the points of fluid influx in a zone of a well and identifying the fluids produced at said points, comprising the steps of: (a) filling the zone with a mixture of granular material of variable particle size to subject the mixture to the influx of said fluids in said zone, (b) removing said material from the well in cores, with the particles in the relation they assumed in said zone, and (c) correlating the changes in particle size distribution of said material with the length of said zone, whereby the points of fluid influx may be determined.

2. In a method as defined in claim 1, characterized further in that the well is first killed, said material is deposited in said zone and then said material is subjected to the influx of the formation fluids in said zone.

3. A method of locating the points of fluid influx in a zone of a well and identifying the fluids produced at said points, comprising the steps of: (a) removing the formation fluids from said zone, (b) depositing a granular material of variable particle size in said zone with the particles being randomly mixed, (c) producing formation fluids from said zone through said material for saturation of said material with the formation fluids produced in said zone and for stratification of said material by the washing action of said fluids, (d) removing said material from the well in cores in its stratified condition, and then (e) examining said material for its variation in stratification and extent and kind of fluid saturation, whereby the points of influx of the various kinds of formation fluids and the identity of such fluids at said points may be determined.

4. A method as defined in claim 3 characterized further in that the formation fluids are removed from said zone by being replaced with a liquid other than oil, then said granular material is deposited in said zone.

5. A method as defined in claim 4 characterized further in that said liquid is water.

6. A method as defined in claim 4 characterized further in that said liquid is drilling mud.

7. A method as defined in claim 4 characterized further in that a second liquid is placed on top of the first-mentioned liquid at a depth such that the hydrostatic pressure in said zone is substantially equal to formation pressure.

8. A method as defined in claim 3 characterized further in that said zone is completely filled with said material.

9. A method of locating the points of fluid influx in a well and identifying the fluids produced at said points, comprising the steps of: (a) killing the well to prevent fluid influx in said zone, (b) replacing the formation fluids in said zone with a liquid other than oil, (c) dumping a granular material having various particle sizes in said zone, with the various sized particles being randomly mixed, (d) producing formation fluids from said zone until said material is stratified by the washing action of the formation fluids, (e) removing said material from the well in cores while retaining the stratification of the material and the fluid saturation of the material, then (f) correlating the stratification and fluid distribution in said material with the depth of said zone.

References Cited in the file of this patent

UNITED STATES PATENTS

| | | |
|---|---|---|
| 1,133,218 | Beecher | Mar. 23, 1915 |
| 2,696,112 | Griffith | Dec. 7, 1954 |